United States Patent [19]
Juda et al.

[11] Patent Number: 6,103,028
[45] Date of Patent: Aug. 15, 2000

[54] METHOD OF FABRICATING THINNED FREE-STANDING METALLIC HYDROGEN-SELECTIVE PALLADIUM-BEARING MEMBRANES AND NOVEL PIN-HOLE-FREE MEMBRANES FORMED THEREBY

[75] Inventors: Walter Juda, Lexington; Charles W. Krueger, Cambridge; R. Todd Bombard, Pelham, all of Mass.

[73] Assignee: Walter Juda Associates, Inc., Needham, Mass.

[21] Appl. No.: 09/252,302

[22] Filed: Feb. 18, 1999

[51] Int. Cl.⁷ .............................. C22B 11/00; C22F 1/14
[52] U.S. Cl. .............................. 148/678; 75/715; 75/741; 205/640; 205/660; 205/685
[58] Field of Search .............................. 95/632, 715, 732, 95/741; 148/678; 205/640, 660, 685

[56] References Cited

U.S. PATENT DOCUMENTS

| | | | |
|---|---|---|---|
| 4,248,688 | 2/1981 | Gartner et al. | 204/192.34 |
| 4,319,923 | 3/1982 | Falanga et al. | 75/741 |
| 4,331,520 | 5/1982 | Juda et al. | 75/718 |
| 4,422,911 | 12/1983 | Juda et al. | 205/576 |
| 5,904,754 | 5/1999 | Juda et al. | 96/11 |

*Primary Examiner*—George Wyszomierski
*Attorney, Agent, or Firm*—Rines & Rines

[57] ABSTRACT

A new method of creating thin free-standing pin hole-free hydrogen-selective palladium-bearing membranes that comprises thinning cold-rolled membranes by chemical etching or electrochemically electrolyzing of at least one membrane surface, and novel membranes produced thereby and including membranes with selected portions only thereof so thinned.

9 Claims, No Drawings

METHOD OF FABRICATING THINNED FREE-STANDING METALLIC HYDROGEN-SELECTIVE PALLADIUM-BEARING MEMBRANES AND NOVEL PIN-HOLE-FREE MEMBRANES FORMED THEREBY

This invention relates to palladium-bearing hydrogen-selective metal membranes, and more particularly to methods of producing such in the form of thinned free-standing pin-hole-free sheet foil membranes.

BACKGROUND

As disclosed in our co-pending applications Ser. Nos. 08/719,385 and 08/880,990, herein incorporated by reference, the art is replete with references to palladium-bearing hydrogen selective membranes and to their use in hydrogen purifiers and reactors and the like. We have stressed in said applications the advantages of palladium alloy membranes in the form of sheet membranes, which have been made significantly thinner than the walls of the commonly used small-diameter tubular membranes. The result has been improved hydrogen permeation as well as significant palladium savings.

As used at times in this specification and the appended claims, the term "hydrogen selective palladium-bearing metal" is intended to embrace palladium metal or a hydrogen selective palladium alloy, and the term "sheet membrane" means a sheet obtained by cold-rolling a palladium-bearing metal billet to a thickness sufficient to insure substantial freedom of pinholes.

The cost and difficulty of the before-mentioned cold-rolling of billets to substantially pinhole-free sheets, however, increases sharply as the sheet thickness decreases. In practice, substantially pin hole-free, free standing sheets of two typical hydrogen-permeable alloys consisting of palladium and copper, about 60% and about 40% (plus or minus ca.3%), respectively, by weight, (herein "Pd60/Cu40") and palladium and silver, similarly about 75% and about 25%, respectively, by weight, (herein "Pd75/Ag25") are not available commercially below a thickness of about 0.001 inch.

The method of fabrication underlying the present invention overcomes the practical limitations in thinness of such cold-rolling techniques and now enables thinner sheet membranes to be practically obtained.

The desirability of this advance is evident from the consideration that the permeability of hydrogen through a free-standing palladium-bearing membrane increases about linearly with decreasing thickness, and this, at the same time, results especially in decreasing the membrane palladium metal content. As the membranes need to be incorporated in purifier and/or reactor equipment and the like, the double advantage of a higher permeation flux with a lower palladium content is further magnified in the resulting lowered equipment cost.

OBJECTS OF INVENTION

It is thus an object of this invention to provide a new and improved method to produce free-standing pinhole-free foil membranes, thinner than can customarily be produced by cold-rolling techniques.

An additional object is to provide such an improved method wherein cold-rolled bearing hydrogen-selective sheet membranes are rendered thinner by partial metal dissolution therefrom.

It is a further object of this invention to enable such method to recover the dissolved metal(s), preferably during said thinning.

It is yet another object to provide such a method adaptable to partially mask said sheet membrane, thereby thinning only selected portions thereof e.g. inner portions of its surface areas.

Still another object is to provide a new and improved thin membrane of this character resulting from fabrication by the novel method.

Other and further objects will be explained hereinafter and will be more particularly pointed out in connection with the appended claims.

SUMMARY

In summary, the invention embraces the method of thinning a flat, substantially pin hole-free, hydrogen-selective palladium-bearing metal sheet membrane, comprising the step of removing substantially uniformly from at least a portion of one surface thereof a sufficient amount of said metal to produce a significantly thinned, but still free-standing, substantially pin hole-free foil membrane, said removing being done by one of chemical and anodic electrochemical dissolution.

Preferred and best mode methods or fabrication steps and resulting thinned membranes made thereby will now be described in detail.

PREFERRED EMBODIMENT'S OF INVENTION

The present invention, as earlier stated, involves thinning a free standing hydrogen-selective palladium-bearing metal sheet membrane, by chemical partial metal dissolution therefrom.

In accordance with the preferred technique hereof, the membrane sheet is initially annealed in hydrogen at an elevated temperature, and then it is subjected to dissolving uniformly from at least a portion of one of its surfaces, a sufficient amount of metal(s); either chemically in an aqueous etch solution, or electrochemically (i.e. anodically) in an electrolyte, thereby producing a significantly thinned, but still free-standing, and substantially pinhole-free foil membrane.

This foil membrane, further, may require a subsequent chemical or physical reactivation step. The dissolved metal (s) can advantageously be recovered as solid metal(s) during the on-going thinning process, either by hydrogen reduction; for example, in accordance with the methods described in U.S. Pat. Nos. 4,331,520, 4,422,911 and 4,478,696, incorporated herein by reference, or by simultaneous cathodic deposition, such as is commonly used in metal refining.

In addition to a palladium sheet membrane, among the many palladium alloys referenced above, the particular Pd60/Cu40 and the Pd75/Ag25 alloys, (by weight and range as above-defined) the palladium (about 93%)-ruthenium (about 7%) alloy, (herein "Pd93/Ru7") and the palladium (about 92%)-yttrium (about 8%) alloy (herein "Pd92/Y8") are preferred sheet membranes to be thinned in accordance with the present invention.

Specifically, an exemplary preferred foil membrane has been made by the method illustrated in the following examples, it being understood, however, that variations therein can be made by those skilled in the art without departing from the methodology underlying the invention.

EXAMPLE 1

A typical annealing condition for an as-received cold-rolled sheet membrane was found to be that achieved by exposure for 15 hours at 320° C. in an atmosphere of slow flowing pure hydrogen.

A 3.5 inch diameter disk of so-annealed 0.001" thick Pd60/Cu40 sheet weighing 1.186 g was placed in the bottom of a 1000 ml beaker containing 37 ml of "neat" etching nitric acid (70%) for 45 minutes at a constant temperature of 35° C. The beaker was gently swirled every 5 minutes. After removal from the acid, the resulting partially etched foil membrane was rinsed, dried and weighed. Its final weight was 0.797 g. i.e. 67% of the initial weight, with a proportioned reduction in thickness.

This membrane was then tested in a gas permeation apparatus for hydrogen and helium permeations on 15.5 cm$^2$ of the membrane area. The hydrogen permeation was only ca. 18 cc/cm$^2$-min at permeation conditions of 300° C., 50 psig H$_2$ pressure on the upstream and 0 psig H$_2$ pressure on the downstream, under the same condition, the hydrogen permeation of an unetched control sample had been ca. 27 cc/cm$^2$-min. The helium permeation values of both the sample and the control were undetectable (<0.1 cc/cm$^2$-min).

For the purpose of reactivating its surfaces, the membrane was then removed from the permeation apparatus and both sides were physically abraded using wet 0.3 micron alumina powder. Upon retesting it in the permeation apparatus, the hydrogen flux had improved from 10 cc/cm$^2$-min. to an initial value of 21.5 cc/cm$^2$-min, and further to 35 cc/cm$^2$-min in 3 hours, to 38 cc/cm$^2$-min in 22 hours and eventually reaching a value of 40 cc/cm$^2$-min after three days. The permeation to helium was, as before, undetectable.

The final observed hydrogen flux is within 1% of the expected flux which, according to accepted theory, is inversely proportional to membrane thickness, which, in this case, can be assumed to be proportional to the weight of the chemically etched sample.

When the same procedure was repeated on un-annealed, as-received cold-rolled sheet membrane, the etching was uneven and in some cases pinholes were observed, while in other cases samples were completely dissolved. Thus, annealing the metal prior to etching, was found to lead to reproducibly slower, but more uniform etching without formation of pinholes.

Hence, while no annealing allowed creating thinner foil membranes, poor yields of pin hole-free foil membranes were attained because such thinning resulted often in excessively non-uniform attack and thus erratic pin hole formation. In short, annealing markedly insured the reproducibility of producing pin hole-free thinned foil membranes.

EXAMPLE 2

A sample of annealed Pc60/Cu40 was placed in and intermittently sealed to a frame apparatus so that only one side of the membrane was etched. By masking the edges, an exposed portion of the membrane was selected one square inch of the central portion, and the initial thickness was 0.001" which enabled the membrane to be free-standing within the frame. One side of the membrane was exposed to 40 ml of "neat" nitric acid under constant agitation at 35° C. for 45 minutes followed by rinsing in water and drying. The amount of material removed or thinning was determined to be approximately 30% by weight of the selected exposed portion or area. Small (7/16" diameter) circles were cut from the etched portion and tested for hydrogen flux in a small permeation apparatus at 300° C. and 50 psig hydrogen upstream and 0 psig hydrogen downstream (testing flux on a 0.25 cm$^2$ membrane area). Again, the initial flux of an as-etched foil membrane was found to be inadequate, namely only 12.5 cc/cm$^2$-min as compared to the expected value of approximately 40 cc/cm$^2$-min (see above in Example 1).

This time, a second small circular foil membrane was chemically reactivated by dipping it in dilute nitric acid (10 parts H$_2$O to 1 part "neat" HNO$_3$ by volume) for 30 seconds, rinsing and drying. It was then tested for hydrogen flux which was found to reach a value actually somewhat better than 40 cc/cm$^2$-min, within several minutes of reaching operating temperature, as opposed to the abraded sample of Example 1, which took several days to reach the expected flux.

While it is not desired to predicate the invention upon a theory, it being sufficient to describe the invention as it has been found to work, we have concluded that the first nitric acid etch had modified the membrane surface, by, for example, leaving a chemical surface contamination which caused the initial significant decrease of the permeation flux.

Whatever the reason, however, we have found that such detrimental surface modifications were physically, and, preferably, chemically removable, resulting in reactivated surfaces, thereby yielding the expected flux enhancement due to the thinning.

By this technique, the chemical etching partial dissolution of the metal of the original flat, substantially pin hole-free, hydrogen-selective palladium-bearing cold-rolled metal sheet membrane, was found to remove metal substantially uniformly from at least a portion of the surfaces thereof, and this was carried out to remove a sufficient amount of said metal to produce a significant thinning, but still leaving the membrane both free-standing and substantially pin hole-free.

In general, preferred cold-rolled membrane sheets have thicknesses between about 0.001 inch and 0.004 inch thick, and the method of the invention preferably thins or reduces the thickness by said metal dissolution at least between about 20% and 90%.

We now turn to examples of successful thinning by anodic electrochemical dissolution.

EXAMPLE 3

Three samples of annealed Pd60/Cu40 foil measuring 2 in. high by 0.625 in. wide by 0.001 in. thick were hung vertically in a beaker through parallel slits in a Teflon sheet resting on the lip of a 25 ml beaker. The slits were cut to provide a 0.25 in. gap between the foils. The foils were immersed to a depth of approximately 0.75 in. in an electrolyte comprised of 0.7M caCl$_2$ in dimethylsulfoxide.

The center foil was operated electrochemically at room temperature as an anode using the outer foils as cathodes. A current of 0.036 A was passed for 30 minutes. The weight of material removed by electrochemical thinning was approximately 45% of the weight of the exposed area.

A small circle of this thinned foil was tested in the permeation apparatus under conditions described in Example 2. Initial hydrogen flux was found to be inadequate, namely 1.4 cc/cm$^2$-min based on thinning from 0.001 in. to 0.00055 in. (i.e. by 55%). Any subsequent decline in flux was changed back to cc/cm$^2$-min by reactivation with air. The permeation of helium through the membrane was undetectable.

EXAMPLE 4

Example 3 was repeated using three new samples of annealed Pd60/Cu40 and 1.5M HCl as the electrolyte. The foils were immersed to a depth of approximately 1 in. A current of 0.015 A was passed for 180 minutes. The weight of the material removed by electrochemical thinning was approximately 60% of the weight of the exposed area.

A small circle of this thinned foil was tested in the permeation apparatus under conditions described in Example 2. Initial hydrogen flux was found to be inadequate, namely less than a 1 cc/cm$^2$-min. A subsequent activation step of exposing the sample to air for 90 minutes at 300° C. resulted in a hydrogen flux of 67 cc/cm$^2$-min. This hydrogen flux corresponds to the expected value of 67 cc/cm$^2$-min. This hydrogen flux corresponds to the expected value of 67 cc/cm$^2$-min based on thinning from 0.001 in. to 0.0004 in. (i.e. by 40%). Any subsequent decline in flux was changed back to 67 cc/cm$^2$-min by reactivation with air. The permeation of helium through the membrane was undetectable.

In accordance with the present invention, suitable annealing conditions, including different temperatures and (chemically inert) gas media, are readily determinable by those skilled in this art. Suitable uniform partial dissolution of metal from the sheet membranes is readily attainable by suitable well-known variations of the critical etching variables, including temperature, composition and concentration of the chemical etching solutes.

Dissolution solutes other than, or in addition to the nitric acid of Examples 1 and 2 may also be employed, the degree of stirring or lack thereof, exposure, and timing of exposure, all enabling control to the desired degree. Finally, anodic dissolution, as in Examples 3 and 4) can similarly be used with preferably low, substantially uniform anodic current densities.

As before described, moreover, during the control of aqueous chemical or anodic dissolution, the dissolved metals may be recovered as solids by one of hydrogen and cathodic reduction.

Further modifications will also occur to those skilled in this art, and such are considered to fall within the spirit and scope of the invention as defined in the appended claims.

What is claimed is:

1. The method of fabricating a flat, substantially pin hole-free, hydrogen-selective palladium-bearing metal sheet membrane, comprising the steps of annealing said membrane, removing substantially uniformly from at least a portion of one surface thereof a sufficient amount of said metal to produce a significantly thinned but still free-standing, substantially pin hole-free foil membrane, said removing being done by one of chemical and anodic electrochemical dissolution and the further step of reactivating said membrane.

2. The method of claim 1 wherein said sheet membrane is between about 0.001 inch and 0.004 inch thick, and wherein its thickness is reduced by said dissolution to between about 20% and 90%.

3. The method of claim 1 comprising the step of recovering the metal as removed in said thinning.

4. The method of claim 1 wherein said metal is a palladium alloy.

5. The method of claim 4 wherein said alloy is one of Pd 60/Cu40, Pd 75/Ag 25, Pd 93/Ru7 and Pd92/Y8.

6. The method of claim 5 wherein said alloy is Pd60/Cu40, and wherein said sheet membrane is sufficiently thick for intermetallic sealing to a frame, and comprising the step of masking the edge of said sheet, thereby thinning only center portions of said membrane.

7. The method of claim 1 comprising the step of masking portions of said membrane surface to restrict said thinning to selected portions thereof.

8. The method of claim 1 wherein said metal is removed from at least one sheet membrane surface by one of controlled aqueous chemical and anodic dissolution, and wherein the dissolved metals are recovered as solids by one of hydrogen and cathodic reduction.

9. The method of claim 8 wherein said metals are dissolved in an aqueous solution comprising nitric acid.

* * * * *